US011925297B1

(12) United States Patent
Brockman

(10) Patent No.: US 11,925,297 B1
(45) Date of Patent: Mar. 12, 2024

(54) CALIBRATION TOOL FOR A COFFEE GRINDER

(71) Applicant: STARBUCKS CORPORATION, Seattle, WA (US)

(72) Inventor: John L Brockman, Edmonds, WA (US)

(73) Assignee: Starbucks Corporation, Seattle, WA (US)

(*) Notice: Subject to any disclaimer, the term of this patent is extended or adjusted under 35 U.S.C. 154(b) by 0 days.

(21) Appl. No.: 18/234,670

(22) Filed: Aug. 16, 2023

(51) Int. Cl.
*A47J 42/38* (2006.01)
*A47J 31/42* (2006.01)
*G05B 19/401* (2006.01)

(52) U.S. Cl.
CPC ............... *A47J 42/38* (2013.01); *A47J 31/42* (2013.01); *G05B 19/401* (2013.01); *G05B 2219/37367* (2013.01)

(58) Field of Classification Search
CPC ........ A47J 31/42; G05B 19/401; G05B 15/02
USPC .......................................................... 700/28
See application file for complete search history.

(56) References Cited

U.S. PATENT DOCUMENTS

| | | | |
|---|---|---|---|
| 2014/0241590 A1* | 8/2014 | Day, Jr. ................... | G06T 5/006 382/110 |
| 2014/0242239 A1* | 8/2014 | Boggavarapu ...... | A47J 31/4492 426/433 |
| 2014/0282198 A1* | 9/2014 | Mayworm .......... | G06F 3/04847 382/110 |
| 2015/0351581 A1* | 12/2015 | Li ............................. | A23F 5/26 700/275 |
| 2016/0199851 A1* | 7/2016 | Vettorel .................. | B02C 25/00 700/282 |

FOREIGN PATENT DOCUMENTS

| | | | | |
|---|---|---|---|---|
| CN | 105717003 B | * | 1/2020 | ......... G01N 15/0227 |
| DE | 40 04 699 A1 | * | 8/1991 | ............. G01N 15/02 |
| EP | 3042591 A | * | 7/2016 | .............. A47J 31/42 |
| IT | 202100001268 | * | 9/2022 | |
| KR | 20210086522 A | * | 7/2021 | ........... G06V 40/174 |

* cited by examiner

*Primary Examiner* — Ronald D Hartman, Jr.
(74) *Attorney, Agent, or Firm* — Kilpatrick Townsend & Stockton LLP

(57) ABSTRACT

A calibration tool for a coffee grinder can receive an image from a camera. The image can depict coffee grinds produced by the coffee grinder. The calibration tool can analyze the image using one or more image processing techniques to determine a representative grind size for the coffee grinds. The calibration tool can determine whether the representative grind size of the coffee grinds deviates from a predefined reference size by at least a threshold amount. In response to determining that the representative grind size of the coffee grinds deviates from the predefined reference size by at least the threshold amount, the calibration tool can output an instruction indicating how to calibrate the coffee grinder to more closely adhere to the predefined reference size.

20 Claims, 8 Drawing Sheets

US 11,925,297 B1

CALIBRATION TOOL FOR A COFFEE GRINDER

TECHNICAL FIELD

The present disclosure relates generally to coffee grinders. More specifically, but not by way of limitation, this disclosure relates to a calibration tool for a coffee grinder.

BACKGROUND

Coffee shops often have coffee grinders for grinding coffee beans into small particles called coffee grounds. The coffee grounds are then fed into a coffee machine to produce coffee for a customer. Normally, the coffee grinder is manually calibrated in the factory or when it is installed in the coffee shop. After the coffee grinder is initially purchased or installed in a coffee shop, it is rarely if ever calibrated again.

SUMMARY

One example of the present disclosure includes a system comprising a camera, one or more processors communicatively coupled to the camera, and a memory. The memory can include instructions that are executable by the one or more processors for causing the one or more processors to perform operations. The operations can include receiving, from the camera, an image of coffee grinds produced by a coffee grinder. The operations can include analyzing the image using one or more image processing techniques to determine a representative grind size for the coffee grinds. The operations can include determining whether the representative grind size of the coffee grinds deviates from a predefined reference size by at least a threshold amount. The operations can include, in response to determining that the representative grind size of the coffee grinds deviates from the predefined reference size by at least the threshold amount, outputting an instruction indicating how to calibrate the coffee grinder to more closely adhere to the predefined reference size.

Another example of the present disclosure includes method comprising receiving, from a camera, an image of coffee grinds produced by a coffee grinder. The method can include analyzing the image using one or more image processing techniques to determine a representative grind size for the coffee grinds. The method can include determining whether the representative grind size of the coffee grinds deviates from a predefined reference size by at least a threshold amount. The method can include outputting an instruction indicating how to calibrate the coffee grinder to more closely adhere to the predefined reference size, in response to determining that the representative grind size of the coffee grinds deviates from the predefined reference size by at least the threshold amount. Some or all of the method steps can be implemented by one or more processors.

Yet another example of the present disclosure includes a non-transitory computer-readable medium comprising program code that is executable by one or more processors for causing the one or more processors to perform operations. The operations can include receiving, from a camera, an image of coffee grinds produced by a coffee grinder. The operations can include analyzing the image using one or more image processing techniques to determine a representative grind size for the coffee grinds. The operations can include determining whether the representative grind size of the coffee grinds deviates from a predefined reference size by at least a threshold amount. The operations can include, in response to determining that the representative grind size of the coffee grinds deviates from the predefined reference size by at least the threshold amount, outputting an instruction indicating how to calibrate the coffee grinder to more closely adhere to the predefined reference size.

DETAILED DESCRIPTION

Figure 1:
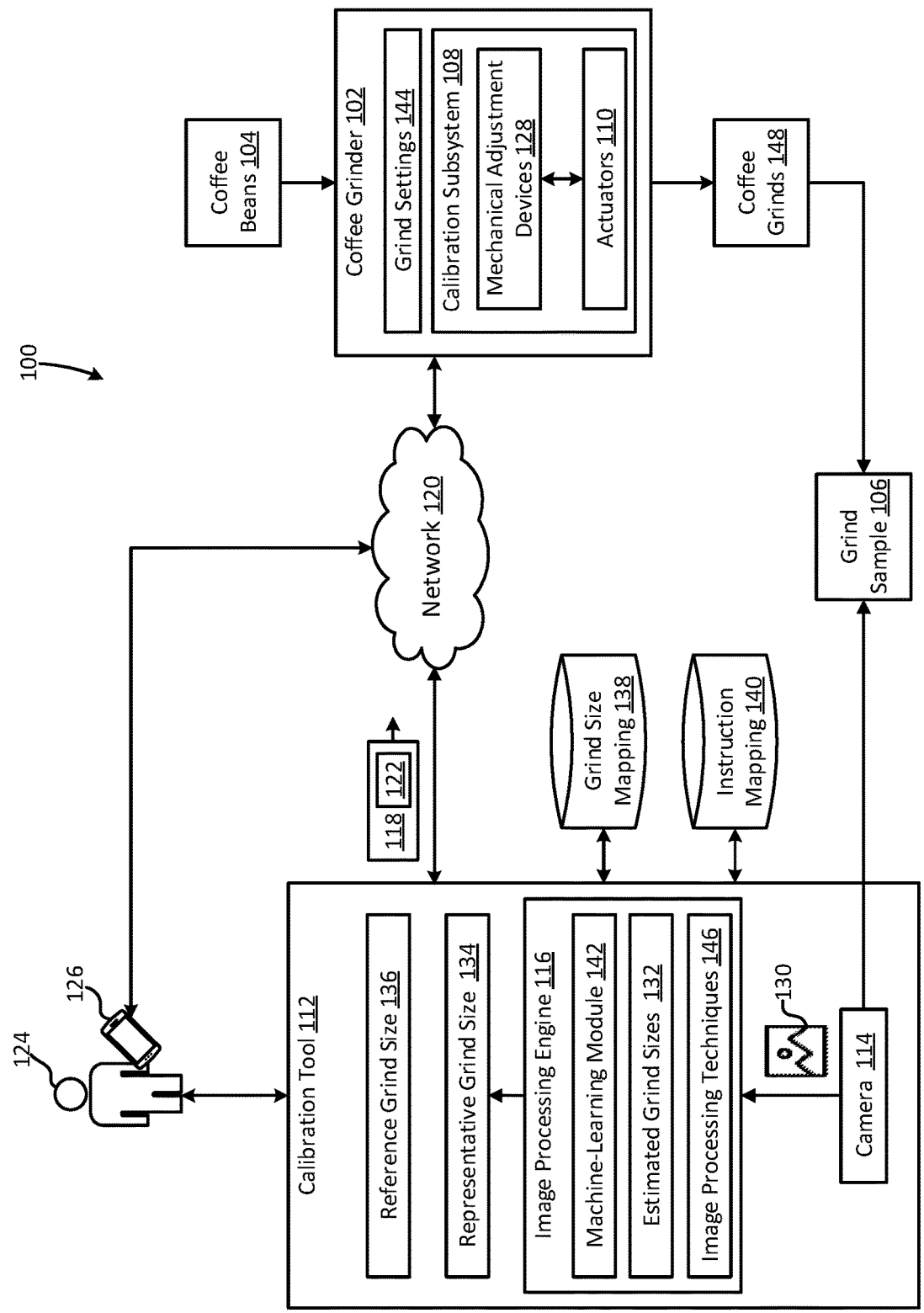
FIG. 1 shows a block diagram of an example of a system that includes a calibration tool for calibrating a coffee grinder according to some aspects of the present disclosure.

Coffee shops often use coffee grinders to make coffee. The coffee grinders may be initially calibrated in the factory or upon their installation in a coffee shop. Over time, the calibration of a coffee grinder can drift (e.g., gradually change on its own) for various reasons. As a result of this unintentional calibration drift, some coffee grinders may produce grinds that are of a different size than other coffee grinders, despite the coffee grinders being of the same type and having the same settings. Because the size of the coffee grounds can affect the taste of the coffee, the calibration drift can lead to inconsistent coffee taste across coffee shops, which may be undesirable. For example, if the coffee shops belong to a franchise that wants to produce a consistent product experience, this kind of taste variation may be unacceptable. Because there is no quick and easy way to detect calibration drift in coffee grinders, the issue of calibration drift and its affect on taste has gone largely unrecognized. And because coffee shops of the same franchise generally operate independently of one another, and rarely perform side-by-side comparisons of their coffee products, many such coffee shops do not even realize that this is a problem. That is, they do not realize that there is significant variation in their coffee's taste relative to the same product from another coffee shop in the same franchise.

Some examples of the present disclosure can overcome one or more of the abovementioned problems by providing a calibration tool for coffee grinders. The calibration tool can include a camera that can capture an image of a sample of coffee grinds produced by a coffee grinder. Using image analysis, the calibration tool can determine a representative grind size for the coffee grinds. The calibration tool can then compare the representative grind size to a reference grind size, which can be selected based on the particular type (e.g., make and model) of coffee grinder used to create the coffee grinds and/or its settings. If the representative grind size of the coffee grinds deviates from the reference grind size by more than a threshold amount, it may mean that the coffee grinder is experiencing calibration drift and may need to be recalibrated. So, the calibration tool can output a notification about the calibration drift. The calibration tool may also output instructions indicating how to calibrate the coffee grinder to more closely adhere to the predefined reference size. For example, the calibration tool can output a series of steps that can be implemented to adjust the calibration of the coffee grinder so that subsequent coffee grinds are closer to the predefined reference size. In this way, the calibration tool can provide a fast, easy, and convenient way to detect and resolve calibration drift in a coffee grinder.

In some examples, the calibration tool can be implemented using a portable handheld device, such as a smartphone or tablet. For instance, an application (or "app") can be downloaded to the portable handheld device. The application can leverage a built-in or attached camera of the portable handheld device to perform the operations described above. This may allow for relatively simple and quick deployment of the calibration tool across a fleet of coffee shops.

In some examples, the calibration tool can use a trained machine-learning model to perform at least some of the image analysis described above. Examples of such a trained machine-learning model can include a neural network such as a deep neural network; a classifier such as a Naive Bayes classifier or a support vector machine; or an ensemble of models. The machine-learning model can be trained on training data that includes images of coffee grinds. The images can be tagged with the attributes (e.g., the locations, boundaries, and/or sizes) of the coffee grinds, so that the machine-learning model can learn to detect coffee grinds in images and derive their attributes. Once trained, the machine-learning model can be applied to new images of coffee grinds to detect the coffee grinds in the images and derive their attributes.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a system 100 for calibrating a coffee grinder 102 according to some aspects of the present disclosure. The coffee grinder 102 can be used to grind coffee beans 104 into coffee grinds 148. A user can deposit the coffee beans 104 into a hopper of the coffee grinder 102 and then operate the coffee grinder 102 to produce the coffee grinds 148. The coffee grinder 102 can have blades and other instruments to grind the coffee beans 104 into the coffee grinds 148. The coffee grinds 148 can be relatively small coffee particles, for example between 0.1 and 800 microns (p) in size. In some examples, the coffee grinder 102 can have multiple grind settings 144 configured to produce coffee grinds of different sizes. For example, the coffee grinder 102 can have "superfine," "fine," "medium fine," and "medium" settings. These settings may correspond to coffee grinds that are 100μ, 300μ, 500μ, and 750μ in size, respectively.

The coffee grinder 102 can include a calibration subsystem 108 for calibrating the size of the coffee grinds 148. The calibration subsystem 108 can include one or more mechanical adjustment devices 128, such as adjustable screws and dials. The mechanical adjustment devices 128 can be physically adjusted to change the size of the coffee grinds produced for a corresponding grind setting 144.

In some examples, the coffee grinder 102 can include electronic components, such as a processor, a memory, a network interface (e.g., for communicating via a network 120), a drive circuit, and one or more actuators 110. The actuators 110 can be part of the calibration subsystem 108 and may be electronically controlled by the processor, for example in response to user input or network communications. Examples of the actuators 110 can include motors and linear actuators. The actuators 110 can be physically coupled to the mechanical adjustment devices 128 to physically manipulate the mechanical adjustment devices 128. For example, the actuators 110 can be configured to receive electronic signals (e.g., from the processor or the drive circuit) and responsively move the mechanical adjustment devices 128. For instance, the actuators 110 can physically rotate an adjustable screw or dial in response to an electronic signal. In this way, the coffee grinder 102 can be electronically controlled to adjust the size of the coffee grinds 148 produced by the coffee grinder 102.

In a typical scenario, the coffee grinder 102 is calibrated when it is first installed in a coffee shop (or in another location at which it will be used). For instance, a human user may operate the calibration subsystem 108 to manually calibrate the coffee grinder 102. After this initial calibration, the coffee grinder 102 may not be recalibrated for a very long time, if ever, given the difficulties of doing so. Without periodically recalibrating the coffee grinder 102, the coffee grinder 102 may be subject to calibration drift. This calibration drift can result from usage, environmental factors (e.g., temperature and humidity), and other factors. Failing to recalibrate the coffee grinder 102 can pose a variety of problems, such as inconsistency of grind size and thus coffee taste across store locations.

To help resolve the abovementioned problems, the system 100 can include a calibration tool 112. In some examples, the calibration tool 112 may be implemented as a portable device, such as a laptop computer, tablet, smartphone, or wearable device such as a smart watch. For instance, the calibration tool 112 can be implemented as a portable handheld device, such as a smartphone or tablet. The calibration tool 112 can use a grind sample 106 to automatically detect whether calibration drift has occurred. The grind sample 106 can be a sample of the coffee grinds 148 that were produced by the coffee grinder 102. In some examples, the calibration tool 112 can also indicate how to resolve the calibration drift. For example, the calibration tool 112 can provide calibration instructions indicating how to calibrate the coffee grinder 102 to resolve the calibration drift.

More specifically, the calibration tool 112 can include one or more cameras 114. The grind sample 106 can be positioned in the field of view of the cameras 114. For example, the grind sample 106 can be positioned on a background object (e.g., a card) within the field of view of the cameras 114. The background object can be colored to have a high contrast with the color of the coffee grinds, which can simplify the image processing later on. For example, the background object may be colored white to simplify detection of the coffee grinds, which may be brown or black. The cameras 114 can then capture one or more images 130 of the grind sample 106 and transmit the images 130 to an image processing engine 116.

The image processing engine 116 can receive the images 130 and locate the coffee grinds depicted in the images 130. For example, the image processing engine 116 can determine the pixel coordinates (e.g., X/Y coordinates) of each coffee grind depicted in the images 130. To do so, the image processing engine 116 can apply one or more image processing techniques 146 to the images 130. Examples of the image processing techniques 146 can include edge detection, contrast enhancement, noise reduction, smoothing, filtering, image segmentation, or any combination of these.

After locating some or all of the coffee grinds in the image 130, the image processing engine 116 can determine an outer boundary of each located coffee grind. For example, the image processing engine 116 can determine the outer perimeter of each coffee grind. The image processing engine 116 can determine the outer boundary of a coffee grind based on shadows, color variations, textural variations, and other visual features associated with the coffee grind and/or adjacent coffee grinds.

Next, the image processing engine 116 can use the outer boundary of each coffee grind to determine one or more dimensions of the coffee grind. Examples of such dimensions can include length, width, and height. For instance, the image processing engine 116 can count the number of image pixels between the longitudinal edges of the coffee grind to estimate a pixel length of the coffee grind. As another example, the image processing engine 116 can count the number of image pixels between the lateral edges of the coffee grind to estimate a pixel width of the coffee grind. As still another example, the image processing engine 116 may use shadow data and/or an image pair from stereo cameras 114 to estimate a height of the coffee grind.

Based on the one or more dimensions of a coffee grind, the image processing engine 116 can determine a size of the coffee grind. In some examples, the image processing engine 116 can determine that the size of the coffee grind is the same as a dimension of the coffee grind. For instance, the size may be equivalent to a length or a width of the coffee grind. In other examples, the image processing engine 116 can determine the size of the coffee grind by translating a dimension of the coffee grind into another format. For instance, the image processing engine 116 can translate a pixel length or a pixel width into a real size (e.g., in millimeters or microns) based on the image resolution of the cameras 114. As one particular example, the image processing engine 116 can covert a pixel length of 8 pixels into a real length of 323 p based on the image resolution of the cameras 114. In some examples, the image processing engine 116 can determine the size of the coffee grind based on two or more dimensions of the coffee grind. For example, the image processing engine 116 can determine the size of the coffee grind by averaging its length and width. Other techniques may also be used to determine a size of the coffee grind. This process can be repeated for some or all of the coffee grinds to generate estimated grind sizes 132 for the coffee grinds.

In some examples, the image processing engine 116 can include a machine-learning module 142 configured to assist in performing the image processing described above. The machine-learning module 142 can include one or more trained machine-learning models. The trained machine-learning models can be configured to locate the coffee grinds in the image 130, determine the outer boundaries of the coffee grinds, determine dimensions of the grinds, or any combination of these.

Because there is normally some variation in the sizes of the coffee grinds in a grind sample 106 (not all of the coffee grinds will be exactly the same size for a given grind setting), the calibration tool 112 can determine a representative grind size 134 for the grind sample 106. For example, the calibration tool 112 can select one of the estimated grind sizes 132 as the representative grind size 134 for the grind sample 106. The selected grind size may be whichever grind size occurred the most times (e.g., is the most frequent grind size) in the group of estimated grind sizes 132. Alternatively, the calibration tool 112 can derive the representative grind size 134 based on two or more of the estimated grind sizes 132. For instance, the calibration tool 112 can derive the representative grind size 134 by determining the average or mean of two or more of the estimated grind sizes 132.

Figure 2:
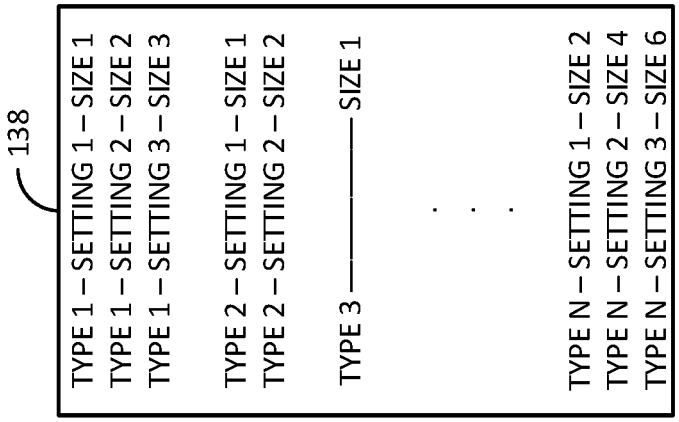
FIG. 2 shows an example of a grind size mapping according to some aspects of the present disclosure.

In addition to determining the representative grind size 134, the calibration tool 112 can determine a reference grind size 136. In some examples, the calibration tool 112 can select the reference grind size 136 from a grind size mapping 138. The grind size mapping 138 can include correlations between types (e.g., makes and models) of coffee grinders, grind settings, and grind sizes. One example of the grind size mapping 138 is shown in FIG. 2. In that example, the grind size mapping 138 correlates types of coffee grinders and their grind settings to grind sizes. The calibration tool 112 can select the reference grind size 136 from grind size mapping 138 based on the type of the coffee grinder 102, the grind setting 144 used to produce the grind sample 106, or both. In some examples, a user 124 may input the type of the coffee grinder 102 and/or its grind setting 144 into the calibration tool 112 for use in this step. Alternatively, the calibration tool 112 can transmit a request to the coffee grinder 102 for its type and settings via one or more networks 120. The coffee grinder 102 can respond to the calibration tool 112 with the requested information.

After determining the representative grind size 134 and the reference grind size 136, the calibration tool 112 can compare the representative grind size 134 to the reference grind size 136. The calibration tool 112 can perform this comparison to determine whether the representative grind size 134 deviates from the reference grind size 136 by at least a threshold amount. For example, the calibration tool 112 can compare a representative grind size of 376 p to a reference grind size of 300 p to determine whether the representative grind size deviates from the reference grind size by at least a 10%. If the representative grind size 134 deviates from the reference grind size 136 by at least the threshold amount, it may mean that the coffee grinder 102 is experiencing an undesirable level of calibration drift.

If the representative grind size 134 deviates from the reference grind size 136 by at least the threshold amount, the calibration tool 112 can generate a notification 118 about the calibration drift. The notification 118 may also indicate the amount of calibration drift that has occurred. For example, the notification 118 can indicate the level of deviation (e.g., the difference) between the representative grind size 134 and the reference grind size 136.

In some examples, the calibration tool 112 can include calibration instructions 122 in the notification 118. The calibration instructions 122 can indicate how to recalibrate the coffee grinder 102 to mitigate or resolve the calibration drift. For example, the calibration instructions 122 can include a sequence of steps indicating how to recalibrate the coffee grinder 102. The calibration tool 112 can select the calibration instructions 122 from an instruction mapping 140. The instruction mapping 140 can include correlations between types of coffee grinders, grind settings, calibration deviation amounts, and calibration instructions. The calibration instructions can be predefined for various calibration scenarios. The calibration tool 112 can select the calibration instructions 122 from the instruction mapping 140 based on the type of the coffee grinder 102, the grind setting 144 used to produce the grind sample 106, the calibration deviation amount, or any combination of these.

After generating the notification 118, the calibration tool 112 may output the notification 118 to a user 124. For example, if the calibration tool 112 includes a display, then the calibration tool 112 can output the notification to the user 124 as a graphical notification on the display. As another example, the calibration tool 112 can transmit the notification 118 to a user device 126 of the user 124. The calibration tool 112 can transmit the notification 118 to the user device 126 via the network 120, which may include a private network (e.g., a local area network), a public network (e.g., the Internet), or a combination thereof. Examples of the user device 126 may include a mobile phone, a smart watch or another wearable device, a laptop computer, a desktop computer, or a tablet. The user device 126 can receive the notification 118 and output it on a display, such as a LCD or LED display. In response to receiving the notification 118, the user 124 can operate the calibration subsystem 108 to recalibrate the coffee grinder 102. For example, the user 124 can follow the calibration instructions 122 to recalibrate the coffee grinder 102. In some examples, the calibration instructions 122 may be presented to the user 124 as interactive guidance in an graphical user interface, with which the user 124 can interact to receive and implement the calibration steps.

The calibration tool 112 may additionally or alternatively output a notification 118 to the coffee grinder 102. For example, the calibration tool 112 can transmit the notification 118 via the network 120 to the coffee grinder 102. The coffee grinder 102 may be configured to receive the notification 118 and automatically perform one or more recalibration operations to resolve the calibration drift. For example, the coffee grinder 102 can automatically operate the actuators 110 in response to the notification 118 to resolve the calibration drift. The coffee grinder 102 can determine how to operate the actuators 110 based on the information and/or calibration instructions 122 provided in the notification 118. For example, the coffee grinder 102 can determine how to operate the actuators 110 based on the difference between the representative grind size 134 and the reference grind size 136, as provided in the notification 118.

In some examples, the calibration tool 112 may be integrated into the coffee grinder 102. For example, after grinding the coffee beans 104 into coffee grinds 148, the coffee grinder 102 may automatically retain a grind sample 106 in a receptacle of the coffee grinder 102 for calibration purposes. Alternatively, a user 124 may manually place the grind sample 106 in the receptacle of the coffee grinder 102 for calibration purposes. Either way, the camera 114 may be positioned on and/or oriented toward the coffee grinder 102 for capturing images of the grind sample 106 in the receptacle. The calibration tool 112 can then process the images, as described above, to detect calibration drift. If the calibration tool 112 detects more than a threshold amount of calibration drift, the calibration tool 112 may output a notification 118 of the calibration drift to a user 124 and/or automatically resolve the calibration drift (e.g., by operating the actuators 110 as described above).

In some examples, the calibration tool 112 may be integrated into a coffee machine. For example, the coffee machine can include a hopper for receiving the coffee grinds 148 to make coffee. The camera 114 may be positioned on and/or oriented toward the coffee machine for capturing images of coffee grinds 148 in the hopper. The calibration tool 112 can then process the images, as described above, to detect calibration drift. If the calibration tool 112 detects more than a threshold amount of calibration drift, the calibration tool 112 may output a notification 118 of the calibration drift. The notification 118 may be output to the user 124 or to the coffee grinder 102, which may respond to the notification 118 by automatically recalibrating itself as described above. In some examples, if the calibration tool 112 detects more than a threshold amount of calibration drift, the coffee machine may automatically prevent coffee from being brewed using the coffee grinds. For example, the coffee machine can automatically disable coffee brewing in response to detecting the calibration drift. This may help prevent against unwanted taste variations in the coffee. The coffee machine may automatically re-enable coffee brewing when the coffee grinds 148 are removed from the hopper. Additionally or alternatively, the user 124 may be able to manually override this feature and re-enable coffee brewing, if desired.

Figure 3:
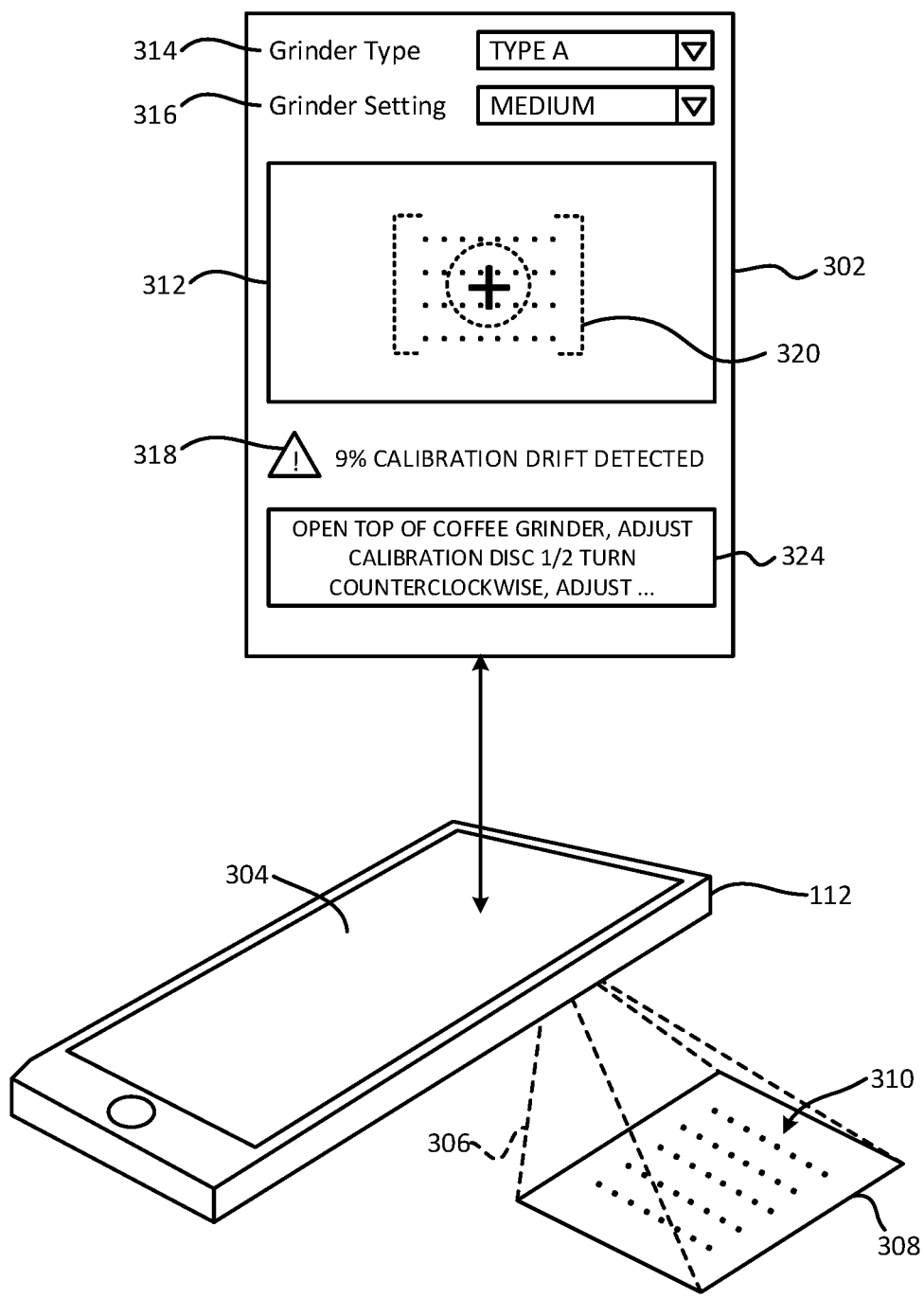
FIG. 3 shows an example of a graphical user interface of a calibration tool according to some aspects of the present disclosure.

In some examples, the calibration tool 112 can include a graphical user interface. One example of such a graphical user interface 302 is shown in FIG. 3. As shown, the graphical user interface 302 can be output on a display 304 of the calibration tool 112. The graphical user interface 302 can include a guidance mechanism 312 that is configured to assist the user in capturing an image of a grind sample 310 using a camera. The camera may be positioned on the underside of the calibration tool 112. The camera can have a field of view 306 that is oriented toward the grind sample 310. The grind sample 310 may be positioned on a background object 308. The background object 308 may be a portable handheld object, such as a card or piece of paper. The background object 308 can be designed to simplify subsequent image processing, for example by having a contrasting color to the grind sample 310.

In some examples, the guidance mechanism 312 can include an augmented reality environment in which a virtual target is overlaid on the field of view 306 of the camera. The guidance mechanism 312 can also include depth assistance to help the user position the camera at the appropriate distance from the grind sample 310. For example, the augmented reality environment can include distance markers 320 or distance feedback that is configured to help the user spatially position the camera at an acceptable distance from the grind sample 310. Once the grind sample 310 is appropriately positioned within the field of view 306 of the camera, the calibration tool 112 can capture one or more images of the grind sample 310. The calibration tool 112 can then perform the image processing described above to detect calibration drift.

To help in detecting the calibration drift, the graphical user interface 302 may include graphical input elements 314, 316 through which the user can input information about the coffee grinder that was used to create the grind sample 310. For example, the user can input a type of the coffee grinder using the first graphical input element 314. The user can also input a grind setting using the second graphical input element 314. The graphical input elements 314, 316 can include any suitable types of graphical input elements, such as text boxes, menus, radio buttons, check boxes, or any combination of these.

If more than a threshold amount of calibration drift is detected, the calibration tool 112 can output an alert 318 in the graphical user interface 302. The calibration tool 112 may also output calibration instructions 324 in the graphical user interface 302 to help the user mitigate or resolve the calibration drift. If more than the threshold amount of calibration drift is not detected (e.g., because the coffee grinder is properly calibrated), the calibration tool 112 may also output a notification in the graphical user interface 302 to indicate that the calibration is acceptable.

Figure 4:
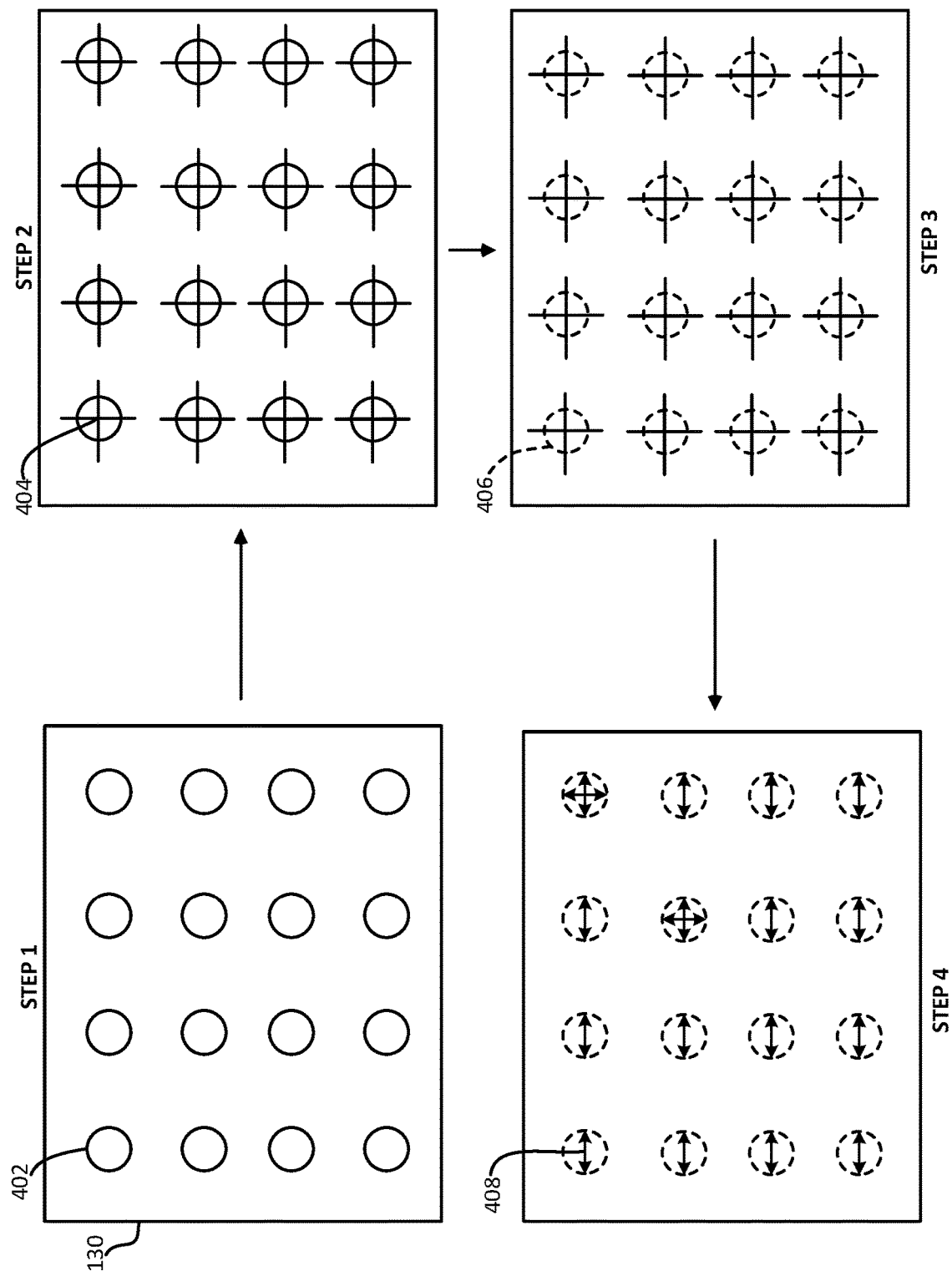
FIG. 4 shows an example of a process for estimating grind dimensions according to some aspects of the present disclosure.

Turning now to FIG. 4, shown is an example of a process for estimating the dimensions of a coffee grind according to some aspects of the present disclosure. The process can be implemented by the calibration tool 112, as described above. The process can begin at step 1 where an image 130 is captured. The image 130 can depict coffee grinds, such as coffee grind 402. At step 2, the image 130 can be processed to detect the location (e.g., location 404) of each coffee grind in the image 130. The locations of the coffee grinds are represented using crosshairs in FIG. 4. At step 3, the outer boundary (e.g., outer boundary 406) of each coffee grind can be detected using its location information. The outer boundaries of the coffee grinds are represented as dashed circles in FIG. 4. At step 4, one or more dimensions (e.g., dimension 408) of each coffee grind can be determined. Although in this example the coffee grinds are shown as having the same size and shape for simplicity, it will be appreciated that real coffee grinds may have different sizes and shapes from one another. Real coffee grinds may also have different shapes than is shown in FIG. 4. For instance, a real coffee grind may not be perfectly circular and thus may have two or more dimensions (e.g., length and width) that are different from one another.

Figure 5:
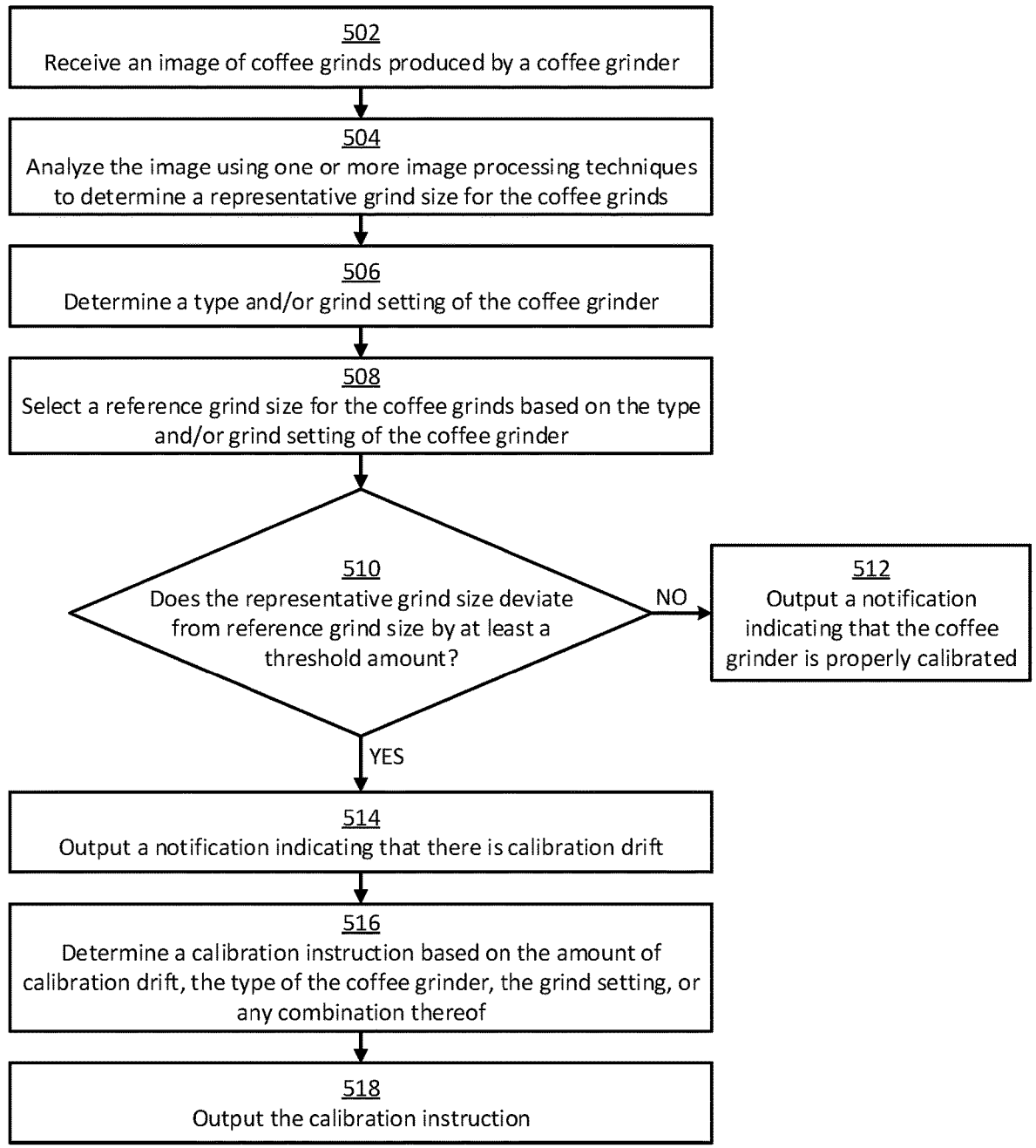
FIG. 5 shows a flowchart of an example of a process for detecting and resolving calibration drift associated with a coffee grinder according to some aspects of the present disclosure.

Turning now to FIG. 5, shown is a flowchart of an example of a process for detecting and resolving calibration drift associated with a coffee grinder according to some aspects of the present disclosure. Other examples may include more operations, fewer operations, different operations, or a different order of operations than is shown in FIG. 5. The steps of FIG. 5 are described below with reference to the components of FIG. 1 described above.

In block 502, a calibration tool 112 receives an image 130 of coffee grinds (e.g., grind sample 106). The coffee grinds are produced by a coffee grinder 102. The calibration tool 112 can receive the image 130 from a camera 114, which may be part of or coupled to the calibration tool 112. Alternatively, the calibration tool 112 can receive the image 130 from another source, such as an image database.

In block 504, the calibration tool 112 analyzes the image 130 using one or more image processing techniques 146 to determine a representative grind size 134 for the coffee grinds. For example, the calibration tool 112 can perform the process shown in FIG. 4 to determine an estimated grind size for each respective coffee grind depicted in the image 130. The calibration tool 112 can then determine the representative grind size 134 based on two or more of the estimated grind sizes. For example, the calibration tool 112 can average together the estimated grind sizes to determine the representative grind size 134 for the coffee grinds.

In block 506, the calibration tool 112 determines a type and/or grind setting 144 of the coffee grinder 102 that made the coffee grinds. For example, the calibration tool 112 can determine the type and/or grind setting 144 based on user input to a graphical user interface, such as GUI 302 of FIG. 3. Alternatively, the calibration tool 112 can determine the type and/or grind setting 144 by communicating with the coffee grinder 102. For example, the calibration tool 112 can communicate with the coffee grinder 102 via one or more networks 120 to request this information from the coffee grinder 102.

In block 508, the calibration tool 112 selects a reference grind size 136 for the coffee grinds based on the type of the coffee grinder 102, the grind setting 144 used to create the coffee grinds, or both. For example, the calibration tool 112 may reference a grind size mapping 138 to select the reference grind size 136 based on these factors.

In block 510, the calibration tool 112 determines whether the representative grind size 134 deviates from the reference grind size 136 by at least a threshold amount. If not, the process can continue to block 512 where the calibration tool 112 can output a notification 118 indicating that the coffee grinder 102 is properly calibrated. Otherwise, the process can continue to block 514.

In block 514, the calibration tool 112 outputs a notification 118 indicating that there is calibration drift. The notification 118 may also indicate the amount of calibration drift. For example, the notification 118 can indicate the difference between the representative grind size 134 and the reference grind size 136. The calibration tool 112 can output the notification 118 to a user 124, to the coffee grinder 102, and/or to another destination. This may involve transmitting the notification 118 over one or more networks 120.

In block 516, the calibration tool 112 determines a calibration instruction 122. The calibration tool 112 can determine the calibration instruction 122 based on the type of the coffee grinder 102, the grind setting 144, the amount of calibration drift, or any combination of these. In some examples, the calibration tool 112 can reference an instruction mapping 140 to determine the calibration instruction 122. The calibration instruction 122 can include one or more steps that can be performed (e.g., manually by a human operator) to correct the calibration drift.

In block 518, the calibration tool 112 outputs the calibration instruction 122. To output the calibration instruction 122, the calibration tool 112 can include the calibration instruction 122 in the notification 118 or in a separate notification. The calibration tool 112 can output the calibration instruction 122 to a user 124, to the coffee grinder 102, and/or to another destination. This may involve transmitting the calibration instruction 122 over one or more networks 120.

Figure 6:
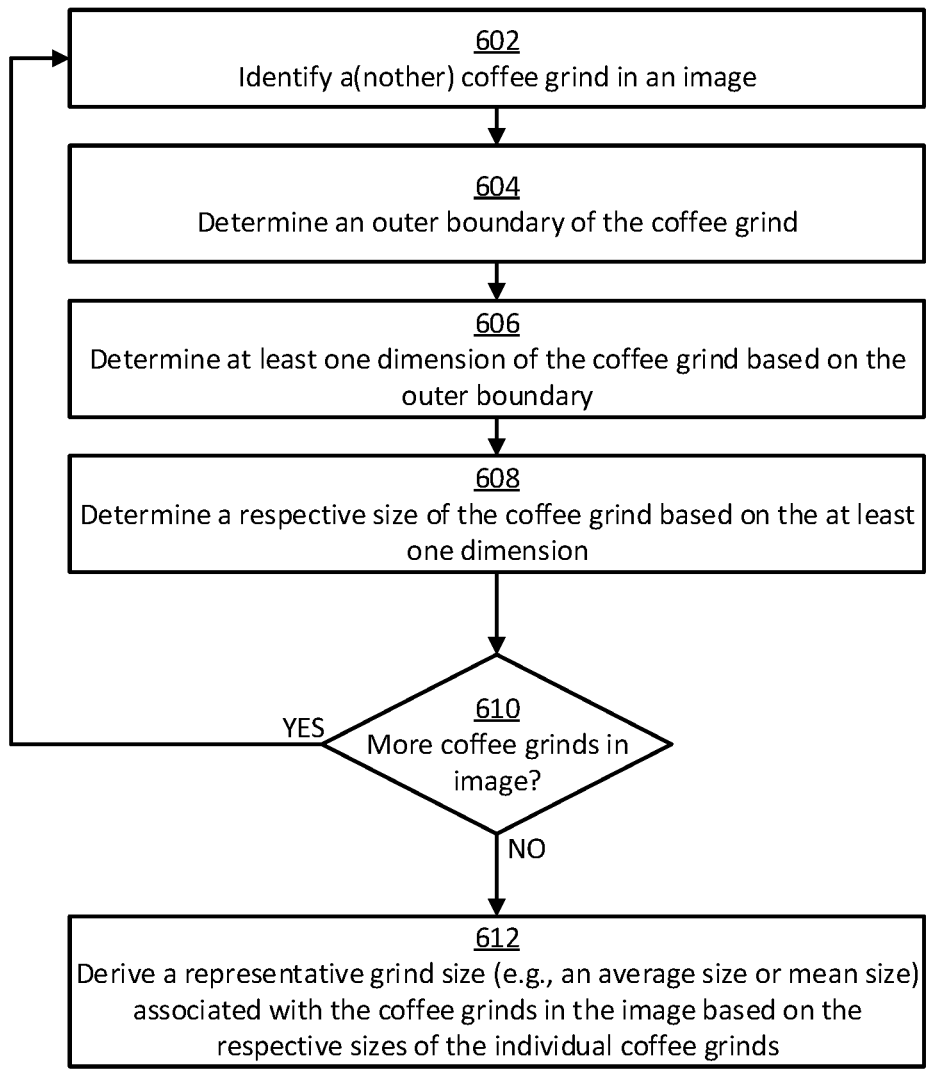
FIG. 6 shows a flowchart of an example of a process for deriving a representative grind size associated with a sample of coffee grinds according to some aspects of the present disclosure.

Turning now to FIG. 6, shown is a flowchart of an example of a process for deriving a representative grind size associated with a sample of coffee grinds according to some aspects of the present disclosure. Other examples may include more operations, fewer operations, different operations, or a different order of operations than is shown in FIG. 6. The steps of FIG. 6 are described below with reference to the components of FIG. 1 described above.

In block 602, a calibration tool 112 locates a coffee grind in an image 130. In some examples, the calibration tool 112 may locate or identify the coffee grind by performing object recognition. For example, the calibration tool 112 can perform object recognition using an object recognition model, such as a trained machine-learning model. One example of such a trained machine-learning model can include a convolutional neural network, which may be trained to identify coffee grinds in an image based on their visual features. The machine-learning model can be trained by performing a supervised learning process using a training dataset, for example that includes labeled images of coffee grinds. After a sufficient number of training iterations, the machine-learning model may be capable of identifying coffee grinds in new images (images not see during the training phase) with a high degree of accuracy. For example, the calibration tool 112 can provide the image 130 as input to the trained machine-learning model, which can responsively identify the coffee grinds in the image 130 and output the locations (e.g., X/Y pixel coordinates) of the identified coffee grinds.

In block 604, the calibration tool 112 determines an outer boundary of the coffee grind. For example, the calibration tool 112 may use a known location of the coffee grind in the image 130 (e.g., as determined in block 602) as a starting point for determining its boundaries. The calibration tool 112 may then perform edge detection around that starting point to determine the edges proximate to that location. From that information, the calibration tool 112 can derive the estimated boundary of the coffee grind.

In some examples, the calibration tool 112 can use a trained machine-learning model to determine the outer boundary of the coffee grind. For example, the calibration tool 112 can provide the image 130 as input to the trained machine-learning model. Based on the image 130, the trained machine-learning model can locate the outer boundary pixels of the coffee grind. The trained machine-learning model can then output the boundary pixels associated with the coffee grind. In some examples, the trained machine-learning model may be the same as, or different than, the machine-learning model used to locate the coffee grind in block 602. For example, the trained machine-learning model may be configured to locate the coffee grind in the image 130 and then identify the outer boundary of the coffee grind in the image 130.

In block 606, the calibration tool 112 determines at least one dimension of the coffee grind based on the outer boundary. For example, the calibration tool 112 can count the number of image pixels along a length of the coffee grind or along a width of the coffee grind. This number of image pixels can serve as a length or width dimension.

In some examples, the calibration tool 112 can use a trained machine-learning model to determine one or more dimensions of the coffee grind based on its outer boundary. The trained machine-learning model may be the same as, or different than, the model(s) used in blocks 602-604. For example, the trained machine-learning model can be configured to locate a coffee grind in the image 130, determine the outer boundary of the coffee grind based on its location, and determine one or more dimensions of the coffee grind based on its outer boundary. The trained machine-learning model can then output the location, outer boundary, and/or dimensions of the coffee grind.

In block 608, the calibration tool 112 determines a respective size of the coffee grind based on the at least one dimension. For example, the calibration tool 112 can determine the respective size of the coffee grind by converting the dimension into another unit of length or format, such as converting the dimension from pixels to a real size (e.g., millimeters or microns). The calibration tool 112 can perform this conversion based on one or more attributes of the camera 114 that captured the image 130, such as the image resolution of the camera 114. As another example, the calibration tool 112 can determine that the respective size of the coffee grind is equal to the dimension. As still another example, the calibration tool 112 can determine the respective size of the coffee grind based on multiple dimensions of the coffee grind. For instance, if the size of the coffee grind corresponds to the volume of the coffee grind, and if the coffee grind is assumed to have a generally rectangular shape, then the calibration tool 112 can determine the volume of the coffee grind by multiplying its length, width, and height dimensions. As yet another example, if the size of the coffee grind corresponds to the volume of the coffee grind, and if the coffee grind is assumed to have a generally spherical shape, then the calibration tool 112 can determine the respective size of the coffee grind based on the equation $V=4/3*\pi*r^2$. In that equation, V is the volume of the coffee grind and r is the radius of the coffee grind, which can serve as the dimension in this example. In other examples, other measurements may alternatively be used as the size of the coffee grind.

In block 610, the calibration tool 112 determines whether there are any more coffee grinds in the image 130 to analyze. If so, the process can return to block 602 and repeat for the next coffee grind. Otherwise, the process can continue to block 612.

In block 612, the calibration tool 112 derives a representative grind size 134 associated with the coffee grinds in the image 130 based on the respective sizes of the individual coffee grinds. For example, the calibration tool 112 may compute the average or the mean of the respective sizes of the individual coffee grinds. That value can then be used as the representative grind size 134. This may help mitigate the impact of outlier grind sizes that are anomalous and not representative of the entire group.

Figure 7:
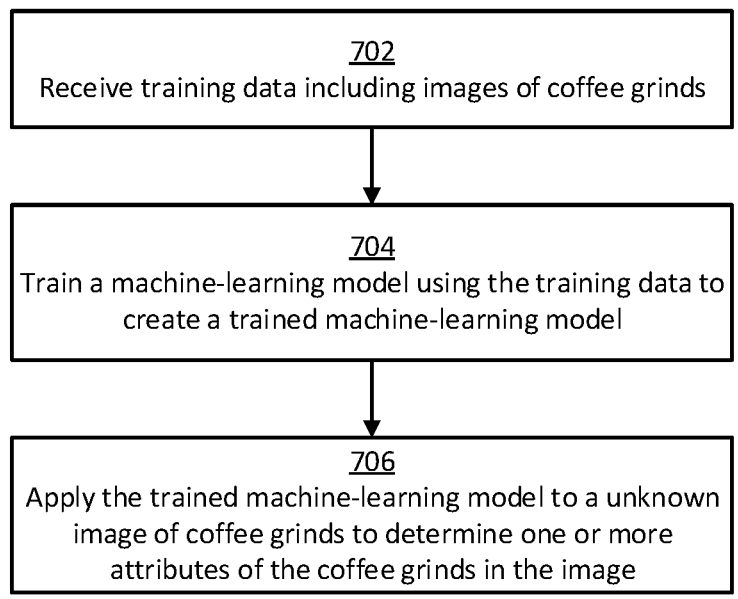
FIG. 7 shows a flowchart of an example of a process for training and using a machine-learning model according to some aspects of the present disclosure.

As noted above, many of the image-processing operations described herein can be implemented using one or more machine-learning models. FIG. 7 shows a flowchart of an example of a process for training and using such machine-learning models according to some aspects of the present disclosure.

In block 702, training data is received. The training data can include hundreds or thousands of images of coffee grinds. The images can be labeled with the locations, outer boundaries, and/or dimensions of the coffee grinds. This labeling may be manually performed by a human, in some examples.

In block 704, a machine-learning model is trained using the training data to create a trained machine-learning model. Training the machine-learning model may involve adjusting hundreds or thousands of its weights over the course of hundreds or thousands of training iterations, to transform the machine-learning model from an untrained state to a trained state.

In block 708, the trained machine-learning model is applied to an unknown image of coffee grinds. An "unknown" image is an image that is not part of the training data. Conversely, a "known" image is an image that is part of the training data. Applying the trained machine-learning model to the unknown image can involve providing the unknown image as input to the trained machine-learning model. The trained machine-learning model can analyze the unknown image to determine one or more attributes of the unknown image. The trained machine-learning model can then output the one or more attributes. Examples of the attributes can include the locations of coffee grinds in the image, the outer boundaries of the coffee grinds, and/or the dimensions of the coffee grinds.

Figure 8:
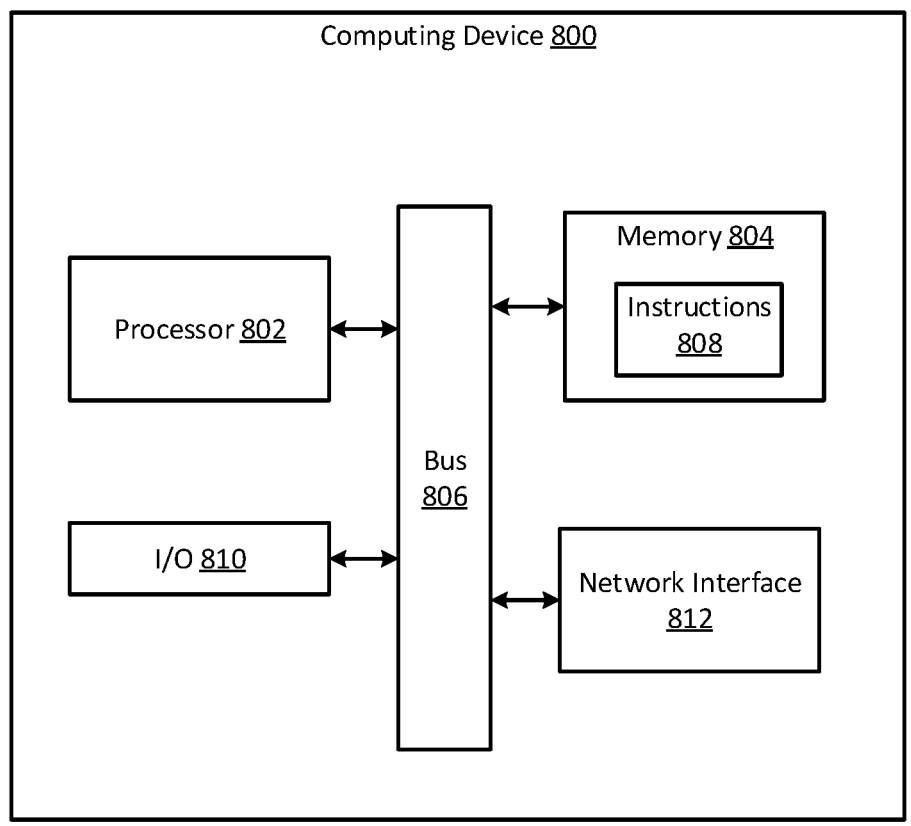
FIG. 8 shows a block diagram of an example of a computing device usable to implement some aspects of the present disclosure.

FIG. 8 shows a block diagram of an example of a computing device 800 usable to implement some aspects of the present disclosure. In some examples, the computing device 800 may correspond to the calibration tool 112, the coffee grinder 102, or the coffee maker described above with respect to FIG. 1.

The computing device 800 includes a processor 802 coupled to a memory 804 via a bus 806. The processor 802 can include one processing device or multiple processing devices. Examples of the processor 802 include a Field-Programmable Gate Array (FPGA), an application-specific integrated circuit (ASIC), a microprocessor, or any combination of these. The processor 802 can execute instructions 808 stored in the memory 804 to perform operations. Examples of such operations can include any of the techniques described above to detect calibration drift in a coffee grinder. In some examples, the instructions 808 can include processor-specific instructions generated by a compiler or an interpreter from code written in any suitable computer-programming language, such as C, C++, C #, Python, or Java.

The memory 804 can include one memory device or multiple memory devices. The memory 804 can be volatile or non-volatile, such that the memory 804 retains stored information when powered off. Examples of the memory 804 include electrically erasable and programmable read-only memory (EEPROM), flash memory, or any other type of non-volatile memory. At least some of the memory device includes a non-transitory computer-readable medium from which the processor 802 can read instructions 808. A computer-readable medium can include electronic, optical, magnetic, or other storage devices capable of providing the processor 802 with computer-readable instructions or other program code. Examples of a computer-readable medium can include magnetic disks, memory chips, ROM, random-access memory (RAM), an ASIC, a configured processor, optical storage, or any other medium from which a computer processor can read the instructions 808.

The computing device 800 may also include input and output (I/O) components 810. Examples of the input components can include a mouse, a keyboard, a trackball, a touch pad, a touch-screen display, a camera (e.g., a single camera or a stereo camera), sensors (e.g., a microphone, a GPS unit, a gyroscope, an accelerometer, a thermometer, and/or an ultrasonic sensor unit), or any combination of these. Examples of the output components can include a visual display such as a touch-screen display; an audio display such as speakers; a haptic display such as a piezoelectric device or an eccentric rotating mass (ERM) device; or any combination of these.

In some examples, the computing device 800 includes a network interface 812. The network interface 812 can include any components configured to facilitate a network connection. Examples can include wired interfaces such as Ethernet, USB, and IEEE 1394. Examples can also include wireless interfaces such as IEEE 802.11, Bluetooth, or radio interfaces for accessing cellular telephone networks (e.g., transceiver/antenna for accessing a CDMA, GSM, UMTS, or other mobile communications network).

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A system comprising:
a camera;
one or more processors communicatively coupled to the camera; and
a memory including instructions that are executable by the one or more processors for causing the one or more processors to:
receive, from the camera, an image of coffee grinds produced by a coffee grinder;
analyze the image using one or more image processing techniques to determine a representative grind size for the coffee grinds;
determine a grind setting of the coffee grinder;
select a predefined reference size based on the grind setting of the coffee grinder, the predefined reference size being selected from among a plurality of predefined reference sizes corresponding to different grind settings of the coffee grinder;
determine whether the representative grind size of the coffee grinds deviates from the predefined reference size by at least a threshold amount; and
in response to determining that the representative grind size of the coffee grinds deviates from the predefined reference size by at least the threshold amount, output an instruction indicating how to calibrate the coffee grinder to more closely adhere to the predefined reference size.

2. The system of claim 1, wherein the memory further includes instructions that are executable by the one or more processors for causing the one or more processors to:
determine a type of the coffee grinder; and
select the predefined reference size based on the grind setting and the type of the coffee grinder.

3. The system of claim 2, wherein the memory further includes instructions that are executable by the one or more processors for causing the one or more processors to:
select the instruction based on the type of the coffee grinder, the instruction being selected from among a plurality of instructions corresponding to different types of coffee grinders.

4. The system of claim 1, wherein the memory further includes instructions that are executable by the one or more processors for causing the one or more processors to:
select the instruction based on the grind setting of the coffee grinder, the instruction being selected from among a plurality of instructions corresponding to different grind settings of the coffee grinder.

5. The system of claim 1, wherein the memory further includes instructions that are executable by the one or more processors for causing the one or more processors to:
for each coffee grind among the coffee grinds:
determine an outer boundary of the coffee grind in the image;
determine a dimension of the coffee grind based on the outer boundary of the coffee grind in the image; and
determine a respective size of the coffee grind based on the dimension.

6. The system of claim 1, wherein the representative grind size of the coffee grinds is an average size or a mean size of the coffee grinds.

7. The system of claim 1, wherein the memory further includes instructions that are executable by the one or more processors for causing the one or more processors to:
provide the image as input to a trained machine-learning model, the trained machine-learning model being configured to generate an output indicating an attribute of a coffee grind depicted in the image; and
determine the representative grind size based on the attribute of the coffee grind.

8. The system of claim 1, wherein the memory further includes instructions that are executable by the one or more processors for causing the one or more processors to:
transmit the instruction via a wired or wireless connection to the coffee grinder, the coffee grinder being configured to receive the instruction and automatically adjust its calibration based on the instruction.

9. The system of claim 1, wherein the one or more processors and the memory are part of a portable handheld device.

10. The system of claim 9, wherein the portable handheld device is a smartphone or tablet.

11. The system of claim 10, wherein the camera is positioned on the coffee grinder.

12. The system of claim 1, wherein the camera is positioned on a coffee machine that is separate from the coffee grinder, the coffee machine being configured to use the coffee grinds from the coffee grinder to produce coffee.

13. The system of claim 1, wherein the memory further includes instructions that are executable by the one or more processors for causing the one or more processors to:
in response to determining that the representative grind size of the coffee grinds deviates from the predefined reference size by at least the threshold amount, output a notification indicating the deviation.

14. A method comprising:
receiving, by one or more processors and from a camera, an image of coffee grinds produced by a coffee grinder;
analyzing, by the one or more processors, the image using one or more image processing techniques to determine a representative grind size for the coffee grinds;
determining, by the one or more processors, a grind setting of the coffee grinder;
selecting, by the one or more processors, a predefined reference size based on the grind setting of the coffee grinder, the predefined reference size being selected from among a plurality of predefined reference sizes corresponding to different grind settings of the coffee grinder;
determining, by the one or more processors, whether the representative grind size of the coffee grinds deviates from the predefined reference size by at least a threshold amount; and
outputting, by the one or more processors, an instruction indicating how to calibrate the coffee grinder to more closely adhere to the predefined reference size, in response to determining that the representative grind size of the coffee grinds deviates from the predefined reference size by at least the threshold amount.

15. The method of claim 14, further comprising:
receiving user input indicating a type of the coffee grinder and the grind setting of the coffee grinder;
selecting the predefined reference size based on the type and the grind setting of the coffee grinder; and
selecting the instruction based on the type and the grind setting of the coffee grinder.

16. The method of claim 14, further comprising:
determining a plurality of sizes of the coffee grinds by, for each coffee grind among the coffee grinds:
estimating an outer boundary of the coffee grind in the image;
determining a dimension of the coffee grind based on the outer boundary of the coffee grind in the image; and
determining a respective size of the coffee grind based on the dimension; and
deriving the representative grind size of the coffee grinds based on the plurality of sizes of the coffee grinds.

17. The method of claim 14, further comprising:
providing the image as input to a trained machine-learning model, the trained machine-learning model being configured to generate an output indicating an attribute of a coffee grind depicted in the image; and
determining the representative grind size based on the attribute of the coffee grind.

18. A non-transitory computer-readable medium comprising program code that is executable by one or more processors for causing the one or more processors to:
receive, from a camera, an image of coffee grinds produced by a coffee grinder;
analyze the image using one or more image processing techniques to determine a representative grind size for the coffee grinds;
determine a grind setting of the coffee grinder;
select a predefined reference size based on the grind setting of the coffee grinder, the predefined reference size being selected from among a plurality of predefined reference sizes corresponding to different grind settings of the coffee grinder;
determine whether the representative grind size of the coffee grinds deviates from the predefined reference size by at least a threshold amount; and
in response to determining that the representative grind size of the coffee grinds deviates from the predefined reference size by at least the threshold amount, output an instruction indicating how to calibrate the coffee grinder to more closely adhere to the predefined reference size.

19. The non-transitory computer-readable medium of claim 18, further comprising program code that is executable by the one or more processors for causing the one or more processors to:
determine a plurality of sizes of the coffee grinds by, for each coffee grind among the coffee grinds:
estimating an outer boundary of the coffee grind in the image;
determining a dimension of the coffee grind based on the outer boundary of the coffee grind in the image; and
determining a respective size of the coffee grind based on the dimension; and
derive the representative grind size of the coffee grinds based on the plurality of sizes of the coffee grinds.

20. A non-transitory computer-readable medium comprising program code that is executable by one or more processors for causing the one or more processors to:
receive, from a camera, an image of coffee grinds produced by a coffee grinder;
analyze the image using one or more image processing techniques to determine a representative grind size for the coffee grinds;
determine a type of the coffee grinder;
select a predefined reference size based on the type of the coffee grinder, the predefined reference size being selected from among a plurality of predefined reference sizes corresponding to different types of coffee grinders;
determine whether the representative grind size of the coffee grinds deviates from the predefined reference size by at least a threshold amount; and
in response to determining that the representative grind size of the coffee grinds deviates from the predefined reference size by at least the threshold amount, output an instruction indicating how to calibrate the coffee grinder to more closely adhere to the predefined reference size.

* * * * *